(12) United States Patent
Schiewer et al.

(10) Patent No.: US 9,545,057 B2
(45) Date of Patent: Jan. 17, 2017

(54) DRIVE SYSTEM FOR A SELF-PROPELLED HARVESTING MACHINE

(71) Applicant: CLAAS SELBSTFAHRENDE ERNTEMASCHINEN GMBH, Harsewinkel (DE)

(72) Inventors: Stefan Schiewer, Warendorf (DE); Andreas Krauss, Harsewinkel (DE); Christian Besand, Bielefeld (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 14/711,915

(22) Filed: May 14, 2015

(65) Prior Publication Data

US 2015/0351323 A1 Dec. 10, 2015

(30) Foreign Application Priority Data

Jun. 5, 2014 (DE) ........................ 10 2014 107 921

(51) Int. Cl.
| | | |
|---|---|---|
| *F16H 21/40* | (2006.01) |
| *A01D 69/00* | (2006.01) |
| *A01D 69/06* | (2006.01) |
| *F16H 57/00* | (2012.01) |
| *A01D 43/08* | (2006.01) |
| *A01D 69/03* | (2006.01) |

(52) U.S. Cl.
CPC ............. *A01D 69/002* (2013.01); *A01D 69/00* (2013.01); *A01D 69/06* (2013.01); *F16H 57/0018* (2013.01); *A01D 43/08* (2013.01); *A01D 69/03* (2013.01)

(58) Field of Classification Search
CPC ..... A01D 69/00; A01D 69/002; A01D 69/005
USPC .......... 180/53.4, 53.6, 53.62, 53.7; 56/14.5; 74/15.2, 15.6, 15.69
See application file for complete search history.

(56) References Cited

U.S. PATENT DOCUMENTS 3,601,957 A * 8/1971 Duncan .................. A01D 45/10
56/13.8
3,633,677 A * 1/1972 Walker .................. A01D 45/006
171/14

(Continued)

FOREIGN PATENT DOCUMENTS

DE 1221480 7/1966
DE 102004042113 4/2006

(Continued)

*Primary Examiner* — Toan To
(74) *Attorney, Agent, or Firm* — Michael J. Striker

(57) ABSTRACT

A drive system for a self-propelled harvesting machine includes a drive engine designed as an internal combustion engine, a first driven pulley driven by the drive engine that at least one drive pulley of a working mechanism via a drive belt. The drive system also includes at least one first and one second hydraulic unit. The drive belt is drivably connected to a pulley that is enclosed in sections by housing elements. The housing elements are disposed opposite one another and are fixed relative to the pulley. The first hydraulic unit and the second hydraulic unit are disposed on the housing elements and, the first hydraulic unit and the second hydraulic unit are drivably connected to a shaft that extends through the pulley.

10 Claims, 3 Drawing Sheets

(56) References Cited

U.S. PATENT DOCUMENTS

| | | | | |
|---|---|---|---|---|
| 8,978,796 | B2* | 3/2015 | Gallazzini | B62D 11/006 180/215 |
| 2006/0152183 | A1* | 7/2006 | Amann | A01D 41/1274 318/461 |
| 2006/0272496 | A1 | 12/2006 | Ohashi | |
| 2008/0295478 | A1* | 12/2008 | Majkrzak | A01D 34/38 56/257 |
| 2009/0118695 | A1 | 5/2009 | Neftel | |
| 2011/0203243 | A1* | 8/2011 | Finkler | A01D 41/127 56/10.8 |
| 2012/0067037 | A1* | 3/2012 | Bohrer | A01D 75/187 60/450 |
| 2013/0291508 | A1* | 11/2013 | Melone | B60G 9/00 56/14.7 |
| 2014/0298766 | A1* | 10/2014 | Furmaniak | A01F 12/56 56/14.6 |
| 2015/0342119 | A1* | 12/2015 | Duquesne | A01F 12/38 700/280 |
| 2015/0351324 | A1* | 12/2015 | Schiewer | F16H 47/02 74/720 |

FOREIGN PATENT DOCUMENTS

| | | |
|---|---|---|
| DE | 102009028056 | 2/2010 |
| EP | 1875793 | 1/2008 |
| EP | 1875933 | 1/2008 |
| GB | 703617 | 2/1954 |
| WO | WO 2008/053607 | 5/2008 |
| WO | WO 2013/018696 | 2/2013 |

\* cited by examiner

DRIVE SYSTEM FOR A SELF-PROPELLED HARVESTING MACHINE

CROSS-REFERENCE TO A RELATED APPLICATION

The invention described and claimed hereinbelow is also described in German Patent Application DE 10 2014 107 921.3, filed on Jun. 5, 2014. The German Patent Application, the subject matter of which is incorporated herein by reference, provides the basis for a claim of priority of invention under 35 U.S.C. 119(a)-(d).

BACKGROUND OF THE INVENTION

The present invention broadly relates to a drive system for a self-propelled harvesting machine. Such drive systems comprise a drive engine, such as an internal combustion engine, a transfer gearbox, which is driven by the drive engine and has a first driven pulley, the first driven pulley disposed on a drive shaft to drive, via a belt, at least one first drive pulley of a working mechanism, such as a cutting cylinder. The drive system also comprises at least one first and one second hydraulic unit, designed as a hydraulic pump, for driving other working mechanisms, e.g., of a front attachment and an intake conveyor mechanism of the self-propelled harvesting machine.

In such a drive system, the first and the second hydraulic pumps are each driven, e.g., by toothed gearing operatively connected to the transfer gearbox or using a drive pulley driven by the belt.

Alternatively, the two hydraulic pumps are driven by an intermediate drive shaft that is integrated into the drive system or by an additional drive pulley. The intermediate drive shaft and the drive pulley drive the first hydraulic pump. The first and the second hydraulic pumps are interconnected by the toothed gearing or are disposed one behind the other such that the first hydraulic pump drives through to the second hydraulic pump, which is disposed downstream of the first hydraulic pump.

A disadvantage of these known drive systems is that, in an arrangement of the hydraulic pumps disposed one behind the other, in which the first hydraulic pump drives through to the second hydraulic pump, the selection of hydraulic pumps that can be used is limited by manufacturer specifications for this operating arrangement.

According to the alternative embodiment of a drive system, in which the drive power for the particular hydraulic pump is drawn separately from the drive train, additional components are required, such as a V-belt pulley, toothed gearing, an intermediate drive, an intermediate drive shaft and the like.

SUMMARY OF THE INVENTION

The present invention overcomes the shortcomings of known arts, such as those mentioned above.

To that end, the present invention provides a drive system and a self-propelled forage harvester comprising a drive system, which is characterized by a simple design.

In an embodiment, the drive system includes a drive engine designed as an internal combustion engine, a first driven pulley driven by the drive engine for driving at least one drive pulley of a working mechanism via a drive belt and at least one first and one second hydraulic unit. The drive belt is drivably connected to a pulley, which is enclosed in sections by housing elements. The housing elements are disposed opposite one another, are fixed relative to the pulley and on which the first hydraulic unit and the second hydraulic unit are disposed. The first hydraulic unit and the second hydraulic unit are drivably connected to a shaft, which extends through the pulley. This novel arrangement makes it possible to drivabiy connect the two hydraulic units by a pulley without the need for additional drive elements and without restricting the selection of which hydraulic units to use.

As used herein, the term "hydraulic unit" refers to a hydraulic pump or a hydraulic motor. The invention anticipates that two hydraulic units, which are designed as hydraulic pumps, are driven by a pulley without the need for additional drive elements and without restricting the selection of which pump types to use. The first hydraulic pump and the second hydraulic pump are driven by the common pulley, but are otherwise independent of one another. Such an arrangement makes it possible to use freely selectable combinations of hydraulic pumps, which, in turn, makes it possible to flexibly adapt to the particular power uptake that is required of the working mechanisms that are driven thereby. In addition, the first and the second hydraulic units can be designed as a combination of a hydraulic pump and a hydraulic motor. For that matter, the invention also includes an embodiment with two hydraulic motors, making it possible to drive the belt, which is guided via the pulley.

Advantageously, the shaft is supported in the housing elements. Preferably, the shaft is designed as a single piece. The shaft is drivably connected to the hydraulic units by a hub. A continuous shaft is easy to manufacture.

Alternatively, the shaft is designed as a hollow shaft having two separate shaft sections, which has the advantage that said hollow shaft can be retrofitted or swapped out on the pulley. The at least two housing elements enclose the two separate shaft sections, in sections.

The respective shaft sections can be formed with a flange section at one end, which is connected to a radially inwardly extending web on the pulley. To this end, the web and the flange sections have through-holes disposed so as to be distributed in the circumferential direction to enable the hollow shaft sections and the pulley to be connected to one another by bolts.

Preferably, the respective housing element has a bearing section used to accommodate a rolling bearing. The rolling bearing is slid onto the respective shaft section once the two housing elements are connected to one another.

Preferably, the respective housing element has a fastening section used to arrange the first hydraulic unit or the second hydraulic unit. The fastening section is designed such that a housing of the first or the second hydraulic unit is enclosed in the circumferential direction, in sections, by the fastening section. The connection of the respective drive shaft of the first or the second hydraulic unit to the respective shaft section is improved thereby, since guidance of the pump housing by the fastening section is achieved, which helps to increase running accuracy.

In particular, one of the two housing elements can have a connecting section that extends in the axial direction, parallel to the shaft, and used to connect the two housing elements to one another. The connecting section extends, in sections, in the circumferential direction of the pulley.

In addition, a support element is disposed between the two housing elements on the side opposite the connecting section.

A jockey pulley can be assigned to the support element. The jockey pulley is pivotably coupled to the support element and supported on the machine housing of the harvesting machine by a tensioning system.

BRIEF DESCRIPTION OF THE DRAWINGS

Further features and advantages of the invention will become apparent from the description of embodiments that follows, with reference to the attached figures, wherein.

DETAILED DESCRIPTION OF THE PREFERRED EMBODIMENTS

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
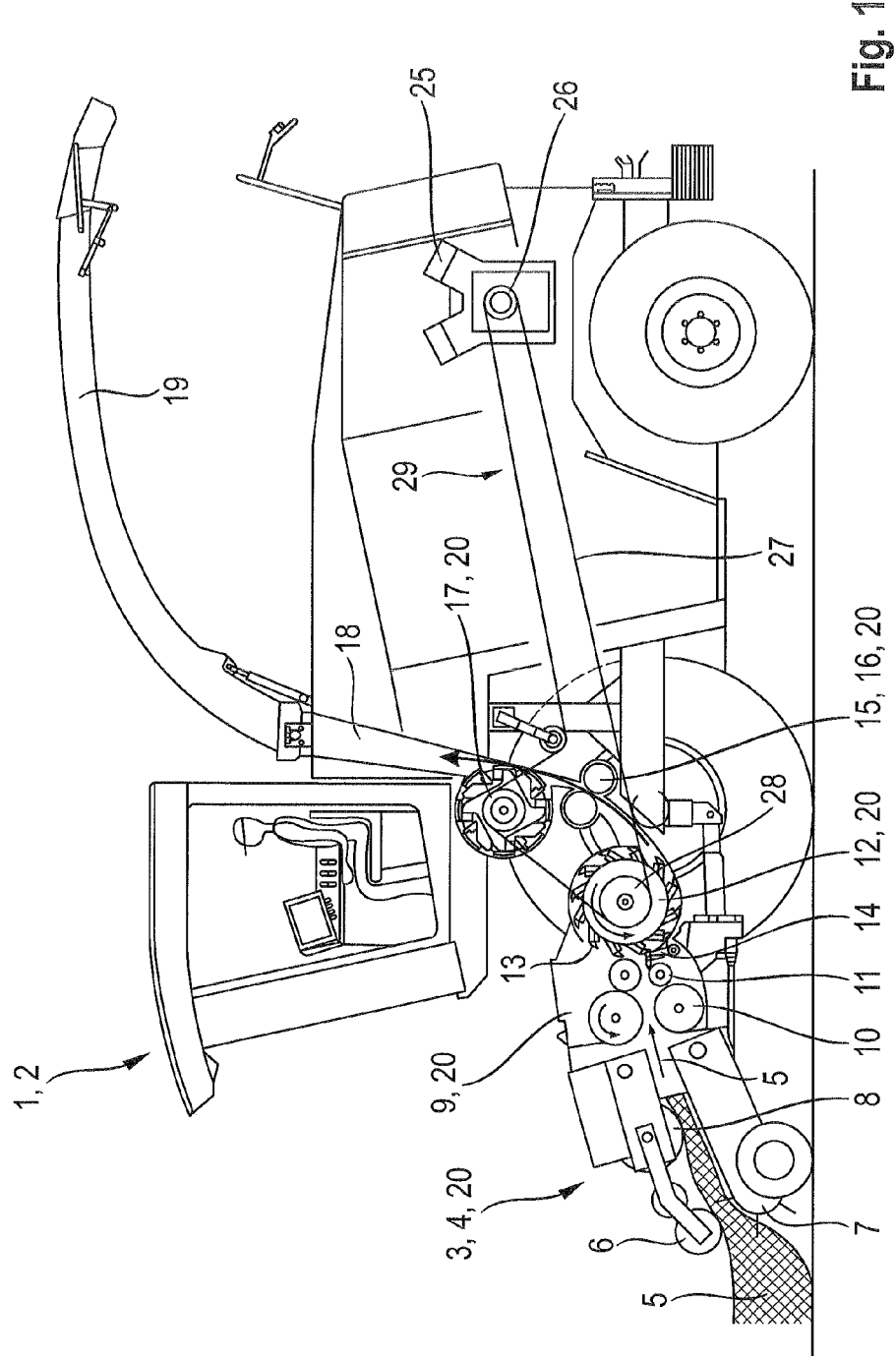
FIG. 1 depicts shows a schematic view of a self-propelled harvesting machine.

FIG. 1 depicts an agricultural harvesting machine 1 designed as a forage harvester 2, in the front region of which a front attachment 3 designed as a pick-up 4 is accommodated. The pick-up 4 is configured such that this accommodates a crop strand 5 between a hold-down device 6 and a pick-up drum 7 and, in the rear region of the pick-up 4, feeds said crop strand to a cross auger 8. The cross auger 8 transfers the crop 5 to intake conveyor mechanisms 9 disposed approximately in the center, downstream of the pick-up 4. The intake conveyor mechanisms 9 are formed by feed rollers 10 disposed in pairs and compression rollers 11 disposed downstream thereof.

After the crop strand 5 has passed through the intake conveyor mechanisms 9, the crop strand is transferred, in the rear region of the intake conveyor mechanisms, to a cutting cylinder 12. The cutting cylinder 12 comprises a large number of chopper knives 13 on the circumference thereof, which, in interaction with a shear bar 14, chop up the crop strand 5. Via the kinetic energy of the rotating cutting cylinder 12, the crop strand 5 exits the rear region of the cutting cylinder 12 at a high rate of speed and is transferred to cracker rollers 15, which are disposed in pairs. The cracker rollers 15 form a so-called rechopper 16.

After the crop strand 5 has passed through the rechopper 16, it reaches the effective region of a post-accelerator 17. The post-accelerator 17 adds kinetic energy to the crop strand 5 in a manner known per se, by which the crop strand 5 is conveyed out of the forage harvester 2 via a lower discharge chute 18. The lower discharge chute 18 points in the vertical direction, and via a discharge spout 19 disposed downstream thereof, is movable so as to pivot and rotate. As shown, the front attachment 3, the intake conveyor mechanisms 9, the cutting cylinder 12, the rechopper 16, and the post-accelerator 17 are the working mechanisms 20 of the agricultural harvesting machine 1.

In addition, a drive system 29 having at least one drive engine 25 is assigned to the forage harvester 2, wherein a drive belt 27 is wrapped around the driven pulley 26 of the drive engine. The drive belt 27 forms, in a manner known per se, a main drive belt for driving the various above-described working mechanisms 20 of the forage harvester 2. A drive pulley 28, which is used to drive the cutting cylinder 12, is drivably connected to the drive engine 25 by the drive belt 27.

Figure 2:
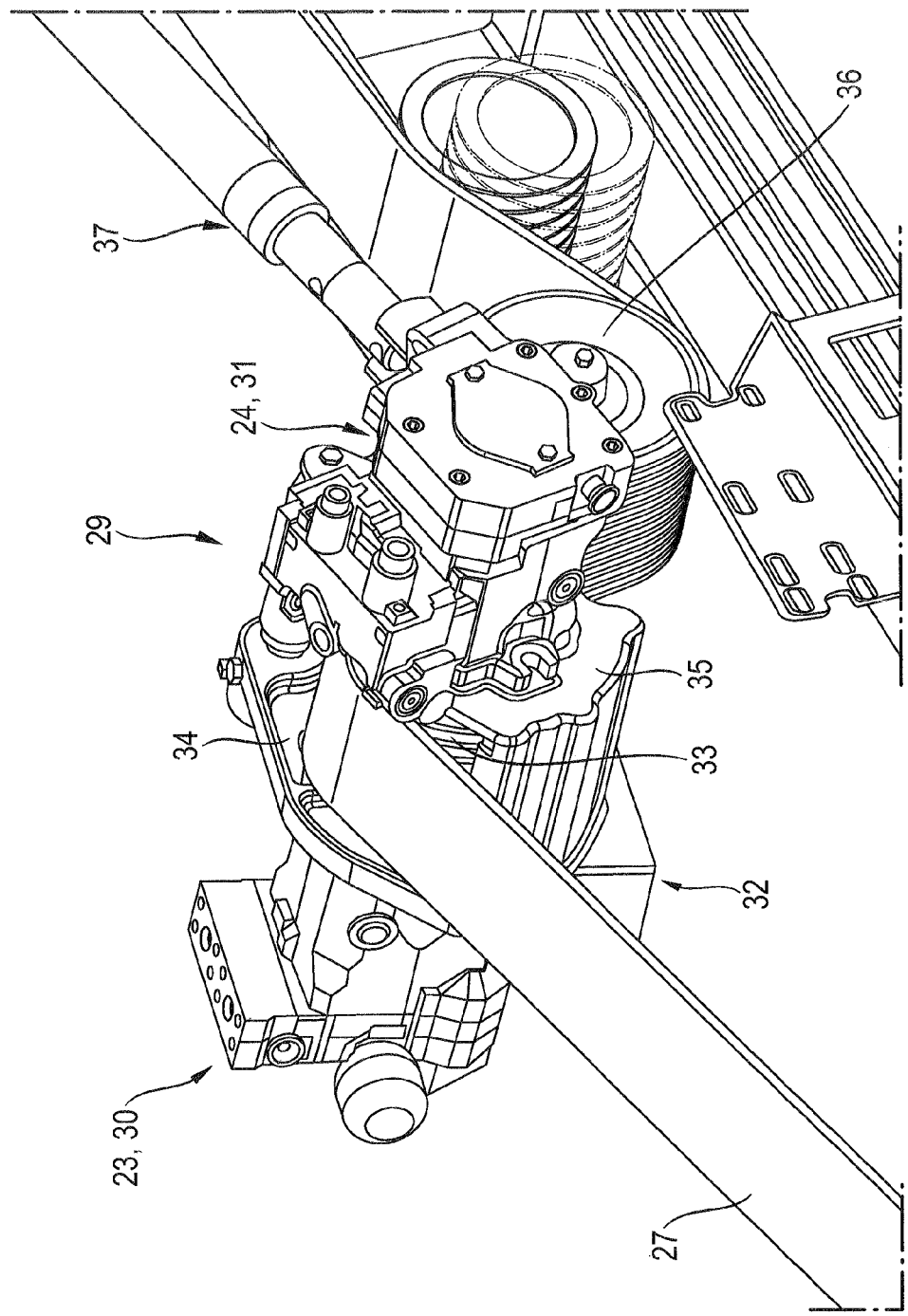
FIG. 2 depicts a schematic partial view of a drive system of the harvesting machine according to FIG. 1.

FIG. 2 shows a schematic partial view of the drive system 29 of the harvesting machine 1 according to FIG. 1. A pulley 33 is integrated into the drive system 29. The pulley is used to drive a first hydraulic unit 23 and a second hydraulic unit 24, a first hydraulic pump 30 and a second hydraulic pump 31. A jockey pulley 36 provides a sufficient amount of belt tension for the drive. The jockey pulley 36 is supported against the machine housing of the forage harvester 2 by a tensioning system 37. The first hydraulic pump 30 is used to drive the intake conveyor mechanism 9, and the second hydraulic pump 31 is used to drive the front attachment 3. The pulley 33 is enclosed, in sections, by a multi-component housing 32. The housing 32 comprises a first housing element 34 and a second housing element 35, which are disposed to be fixed relative to the pulley 33. To this end, at least one of the housing elements 34, 35 is fastened on the machine frame. The first and the second hydraulic units 23, 24 can be designed as two hydraulic motors or as a combination of a hydraulic pump and a hydraulic motor.

Figure 3:
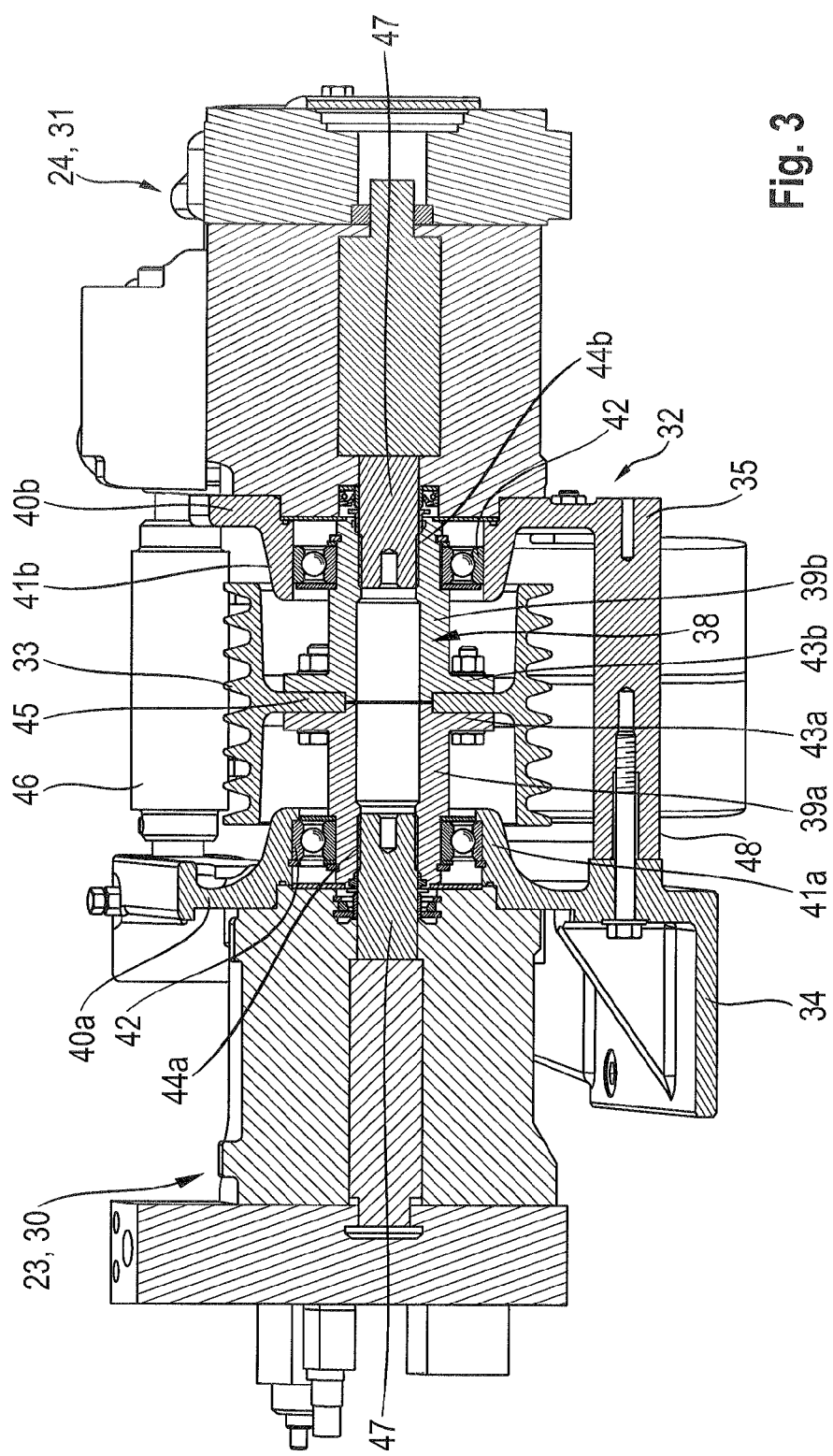
FIG. 3 depicts a sectional view according to FIG. 2.

FIG. 3 depicts shows a schematic sectional view according to FIG. 2 through the housing 32 and the first hydraulic pump 30 and the second hydraulic pump 31. The first housing element 34 and the second housing element 35 are detachably connected to one another by bolted connections. To this end, a connecting section 48 is provided, which encloses the pulley 33 in sections. Each of the two housing elements 34, 35 has a radially outwardly extending fastening section 40a, 40b, used to position the first and the second hydraulic pumps 30, 31, respectively. A pump housing of the first and the second hydraulic pumps 30, 31, respectively, is supported in the radial direction against the fastening section 40a, 40b, respectively. In addition, the respective fastening sections 40a, 40b form a recess, which is adapted to the outer contour of the pump housing and extends in the axial direction such that the respective fastening section 40a, 40b encloses the pump housing in the circumferential direction, in sections.

Moreover, the first housing element 34 and the second housing element 35 comprise a bearing section 41a, 41b, respectively, which extend in the axial direction, and on each of which a rolling bearing 42 is disposed. A shaft 38 extends through the pulley 33. The shaft 38 is designed as one piece, and preferably (in the embodiment shown), the shaft 38 is designed as a hollow shaft 39. The hollow shaft 39 comprises two shaft sections 39a, 39b, on one end of which a flange section 43a, 43b, respectively, is provided.

The pulley 33 comprises a web 45, which is disposed substantially in the center and extends in the radial direction. The shaft sections 39a, 39b are fastened on the web 45 by the flange section 43a, 43b, respectively. To this end, the web 45 and the flange sections 43a, 43b have through-holes, which are disposed to be distributed in the circumferential direction, and which are used to bolt the shaft sections 39a, 39b and the pulley 33 to one another. The respective free ends of the shaft sections 39a, 39b are used to accommodate the respective rolling bearing 42. An inner toothing 44a, 44b is provided on the inner side of the free ends of the shaft sections 39a, 39b, respectively. The inner toothings mesh with a corresponding outer toothing of a respective drive shaft 47 of the first hydraulic pump 30 and of the second hydraulic pump 31.

The multi-component design of the housing 32 and the hollow shaft 39 makes a simple retrofit possible. The multi-component design of the housing 32 and the hollow shaft 39 also makes it possible to easily replace individual components. The arrangement of the first hydraulic pump 30 and the second hydraulic pump 31, which makes it possible to dispose the housing 32 and the hollow shaft 39 on both sides of the pulley 33, provides advantages in terms of installation space, as compared to an arrangement of the hydraulic units one behind the other. In addition, the first hydraulic pump 30 and the second hydraulic pump 31 can be selected independently of one another, thereby ensuring increased efficiency. The costs for an additional bearing point with a power take-off are eliminated.

A support element 46 is disposed between the first and the second housing elements 34 and 35, extends axially parallel to the hollow shaft 39 and connects the housing elements to one another. In addition, the jockey pulley 36 is pivotably coupled to the support element 46.

LIST OF REFERENCE SIGNS 1 harvesting machine
2 forage harvester
3 front attachment
4 pick-up
5 crop strand
6 hold-down device
7 pick-up drum
8 cross auger
9 intake conveyor mechanism
10 feed roller
11 compression roller
12 cutting cylinder
13 chopper knife
14 shear bar
15 cracker rollers
16 rechopper
17 post-accelerator
18 lower discharge chute
19 discharge spout
20 working mechanism
23 first hydraulic unit
24 second hydraulic unit
25 drive engine
26 driven pulley
27 drive belt
28 drive pulley
29 drive system
30 first hydraulic pump
31 second hydraulic pump
32 housing
33 pulley
34 first housing element
35 second housing element
36 jockey pulley
37 tensioning system
38 shaft
39 hollow shaft
39a shaft section
39b shaft section
40a fastening section
40b fastening section
41a bearing section
41b bearing section
42 rolling bearing
43a flange section
43b flange section
44a inner toothing
44b inner toothing
45 web
46 support element
47 drive shaft
48 connecting section As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A drive system for a self-propelled harvesting machine, comprising:
    a drive engine designed as an internal combustion engine;
    a first driven pulley driven by the drive engine for driving at least one drive pulley of a working mechanism via a drive belt;
    at least one first and one second hydraulic unit; and
    a second pulley drivably connected to the drive belt and enclosed in sections by housing elements that are disposed opposite one another, fixed relative to the second pulley and on which the first hydraulic unit and the second hydraulic unit are disposed;
    wherein the first hydraulic unit and the second hydraulic unit are drivably connected to a shaft that extends through the second pulley; and
    wherein the shaft is supported in the housing elements.

2. The drive system according to claim 1, wherein the shaft is designed as one piece.

3. The drive system according to claim 1, wherein the shaft is designed as a hollow shaft having two separate shaft sections.

4. The drive system according to claim 3, wherein the respective shaft sections include a flange section at one end that are connected to the second pulley via a radially inwardly extending web.

5. The drive system according to claim 1, wherein the respective housing elements have a bearing section that is used to accommodate a rolling bearing.

6. The drive system according to claim 1, wherein the respective housing elements have a fastening section used to arrange the first hydraulic unit or the second hydraulic unit.

7. The drive system according to claim 1, wherein one of the two housing elements has a connection section that extends in an axial direction, parallel to the shaft, and is used to connect the two housing elements to one another.

8. The drive system according to claim 7, wherein a support element is disposed between the two housing elements on the side opposite the connecting section.

9. The drive system according to claim 8, wherein a tensioning system is assigned to the support element.

10. A self-propelled forage harvester, comprising a drive system according to claim 1.

* * * * *